United States Patent [19]
Mims

[11] 3,799,310
[45] Mar. 26, 1974

[54] LIQUID DISPENSER HAVING SOLID STATE CONTROL

[75] Inventor: Powell O. Mims, Golden, Calif.

[73] Assignee: Tokheim Corporation, Fort Wayne, Ind.

[22] Filed: May 25, 1972

[21] Appl. No.: 256,810

[52] U.S. Cl. .................................................. 194/5
[51] Int. Cl. ............................................. G07f 7/04
[58] Field of Search .......... 194/13, 5; 222/2, 17, 20, 222/14

[56] References Cited
UNITED STATES PATENTS

| | | | |
|---|---|---|---|
| 3,365,045 | 1/1968 | Guttmann et al. | 194/13 |
| 3,587,808 | 6/1971 | Romanowski | 194/13 |
| 3,122,271 | 2/1964 | Grant | 222/17 |
| 3,638,832 | 2/1972 | Sauber et al. | 222/17 |

Primary Examiner—Stanley H. Tollberg
Attorney, Agent, or Firm—Stan C. Kaiman

[57] ABSTRACT

A system, including a totally electronic logic control device, is provided for controlling a dispenser of liquids, primarily gasoline, in response to currency introduction before and during delivery. The control, consisting exclusively of electrical connections between the currency validator, electronic control device and dispenser, will permit precise delivery of a determined amount in relation to instantaneously correlated control signals. Additionally, the invention is adaptable to control delivery in response to a remote console unit where credit is preselected manually by an operator.

6 Claims, 5 Drawing Figures

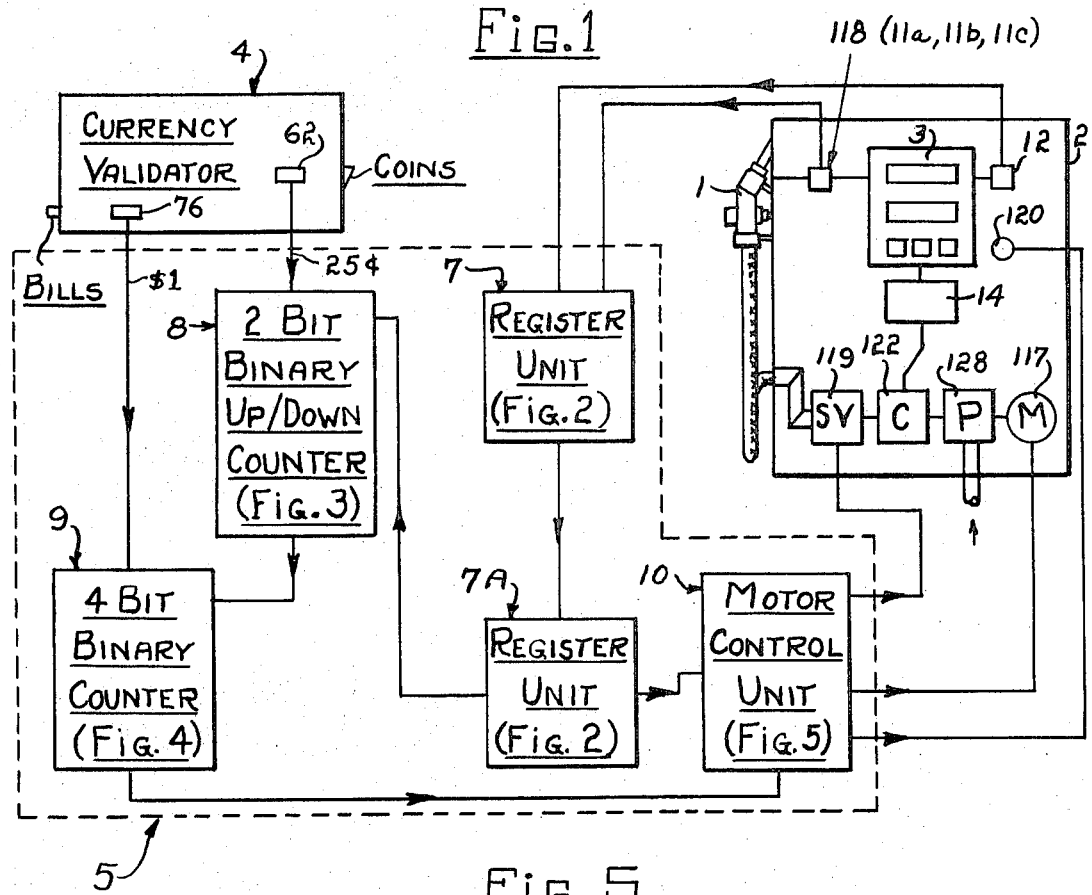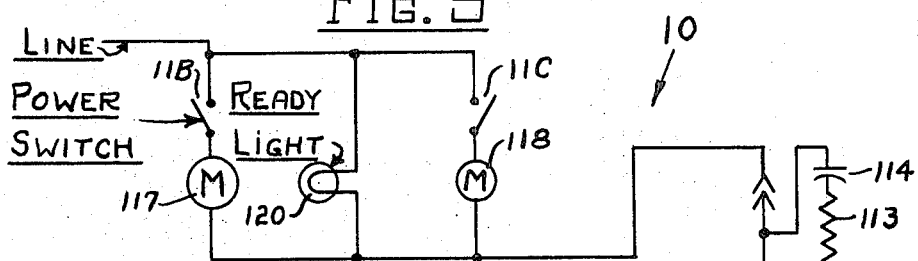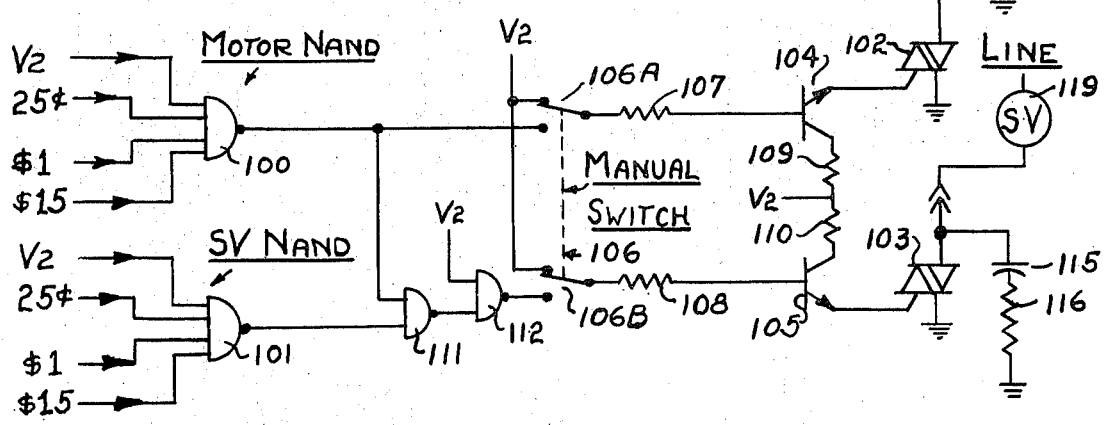

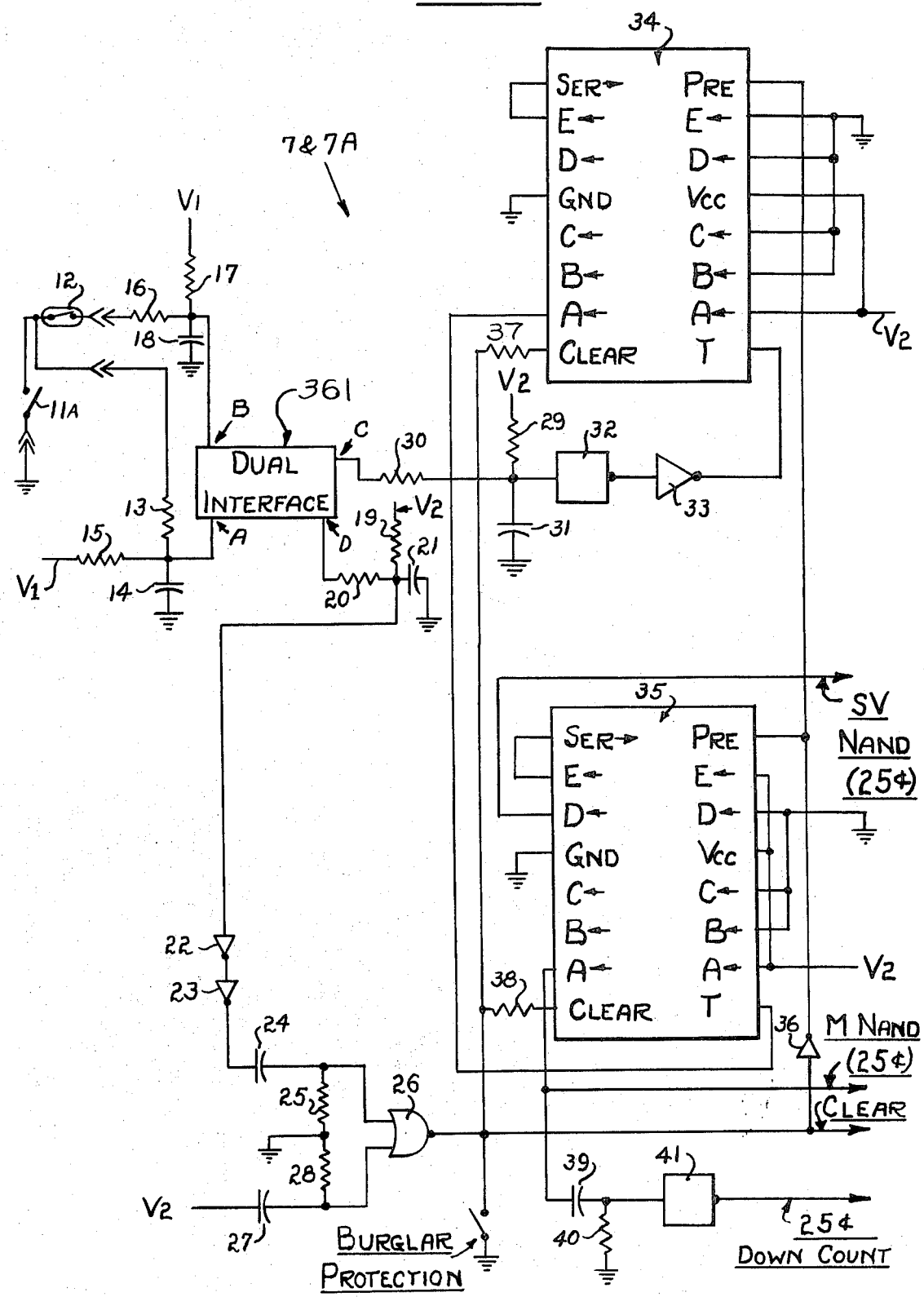

LIQUID DISPENSER HAVING SOLID STATE CONTROL

BACKGROUND OF INVENTION

In recent years, it has become desirable to utilize self-service liquid dispensers, particularly in the petroleum consumer market area as a means to eliminate or free the dispenser attendant for other services. In order to accomplish this purpose, many electro-mechanical systems have been devised. Typical of the prior efforts, is U.S. Pat. application Ser. No. 226,406, filed Feb. 15, 1972 by Elmer A. Robbins. Such systems have, however, many limitations arising from the electro-mechanical nature of the design. Thus, in order to provide a novel dependable system, a totally solid state computer to control the dispenser, comprising many new features not otherwise available has been devised.

In addition to the new features, the invention contains those characteristics which are inherent to solid state technology while completely eliminating the need for moving parts, such as gear trains, relays, cam-operated switches and timing devices, used in present systems and constituting the primary cause of low dependability and low response rate of the present art.

Of these two problem areas, lack of dependability and low acceptance response rate, the latter has been completely eliminated by the novel features of this invention. Existing systems are designed to and thereby limited to accepting delivery pulses at a rate equal to present dispenser delivery capabilities, and to clear at rate slower than desired. By adopting solid state logic circuitry, the response is, for all practical purposes, instantaneous. This permits the dispenser to be updated from a capacity standpoint without being limited in this area, while further providing the feature of being instantaneously cleared. Instantaneous clearance is particularly important in burglar protection. By instantaneously clearing, should one tamper with the electronic circuits, and thereby ground one, all circuitry is automatically cleared and any credit lost. Present system requires a mechanical countdown; thus by tampering with the system, one can still acquire delivery for a period after initiation of the alarm circuitry.

Another problem relative to existing currency controlled dispensers is the limit on the amount of credit which can be stored due to the inherent characteristics of electro-mechanical components. This problem is further amplified by the necessity for a lock-out feature that prevents currency insertion during the delivery phase. As the customer cannot predetermine the quantity of liquid he will need to fill his tank, he must go through a trail and error process of establishing credit and then exhausting it until his tank is filled. If his tank is full and credit remains on the dispenser, it is lost as there is typically no refund mechanism. Accordingly, provisions have been incorporated for more flexibility in the form of allowing currency insertion during the delivery phase of both bills and coins as well as higher initial credit allowances.

The use of solid state components does have some problems to be overcome. Should power be lost and then restored, there is a possibility of locked-in signals somewhere in circuit. A novel solution to this problem has been provided in the use of shift registers where a clear and preload signal is automatically generated when power is restored. Thus if power is lost, and then restored the circuits are automatically initialized. This in effect completely erased all credits from the system instantaneously. It has further been found that buffers are needed to increase the noise immunity to prevent the sporatic signals which may be caused by ambient electric noise. A further disadvantage of the prior system is their relatively large size and the necessity of mechanically connecting the control devices to the dispenser comparator, which had required the mounting of a separate enclosure usually on top or adjacent to the dispenser. By developing a relatively small control device, utilizing solid state components, it can be located well within the existing structure while the only additional external fixture is a currency validator. This will allow considerable flexibility in the styling of the dispenser stand while allowing for a more esthetically pleasing apparatus. It should be noted that because of its size and the fact that it requires only conduit connections, it is possible to locate it completely external to dispenser stand, something not possible with electro-mechanical systems. Because of its minimum conduit connectors, it can be serviced by one not possessed of electrical expertise. In fact, it is possible to completely remove the control device and install a new one in only a few minutes. This allows the defective unit to be sent back to the factory for corrections while an electro-mechanical system may require many hours of repair by factory trained personnel and complete removal being a major operation. Should trouble occur, it could easily be replaced with tools normally found in a service station and this at a minimum of cost and "down-time".

In addition, this system provides for those standard features normally found in existing automatic systems. Primarily, the system will de-energize the motor and valve control circuit at the exhaustion of credit. It should be noted, that with a minimum modification, the system can be adopted for use in preset manual delivery control system similar to that described in U.S. Pat. No. 3,498,501 issued to Robbins, et al. Here the quantity to be delivered manually predetermined at an external console and by measuring delivery pulses it is adapted to de-energize the pump motor control circuit at the desired quantity. In addition, the control device has a feature to allow, at a selected time prior to completion, a slow-flow valve to close and thus reduce the flow to avoid overshooting the desired quantity.

In view of the above discussion, the primary objective of this invention is to provide a solid state electronic system, the operation of which is predicated on a valid currency insertion, with no moving parts, and with individual components having life expectancy measured in millions of hours, fractional power requirements, smaller space and weight features, as well as those general characteristics usually found in solid state logic systems. More specifically, it is an object of our invention to provide an imporved system which is capable of validating multiple currency (coins and bills), prior to and during delivery, store varying amounts of credit (up to $15) and terminate delivery at a point coterminous with the pre-established credit.

Yet another object is to provide a compact, self-contained, control device requiring no mechanical connection (gears, shafts, coins) to the device being controlled.

Another object of this invention is to provide a packaged circuit with a minimum number of integrated circuits.

Sill another object is to provide a system that is not responsive to ambient electronic noise such as those emitted by unsuppressed automotive ignition systems.

Another object of this invention is to provide a system, traditionally located out-of-doors, that is capable of withstanding all weather conditions.

A further object of this invention is to provide a system of the type described which will prevent sporatic signals from being locked in during power transients, and thereby, allowing sporatic credits following a power restoration.

Another object of the invention is to provide a control system at a reasonable cost, primarily by the elimination of bulky electro-mechanical components and the substitution replacement of printed circuitry which is adaptable to automatic machine wiring.

Yet another object of the invention is to provide a manual switch that will permit override of the control circuit, thereby permitting manual delivery by a dispenser attendant.

Another object of this invention is to place, in addition to solid state components in the control circuitry, but also in the motor line circuitry for more effective control.

Another object of this invention is to provide a control system having a minimum number of moving parts.

BRIEF DESCRIPTION OF THE DRAWINGS

The accompanying drawings illustrate the invention.

In such drawings:

FIG. 1 is a block diagram of a dispenser and control system embodying the invention, showing the major components of the system.

FIG. 2 is an electrical schematic of the registry circuit for accumulation of input pulses as liquid is actually delivered, and the circuits that generate the clear and preload signal prior to the dispensing operation.

FIG. 5 is an electrical schematic of the power and control circuits for the dispenser pump motor and slow flow valve.

DESCRIPTION OF THE EMBODIMENT SHOWN

Figure 3:
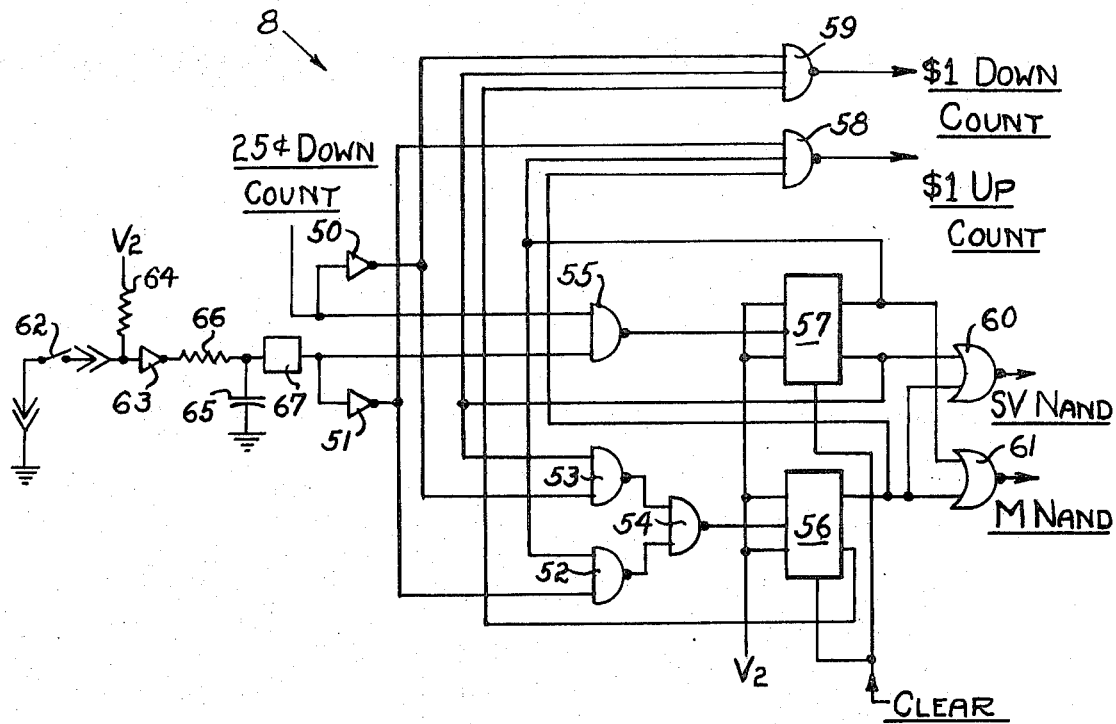
FIG. 3 is an electrical schematic showing the accumulation of credit by means of quarter insertion.

The system shown in FIG. 1 comprises a solid state control device 5 electrically connected to control the dispenser pump motor 117, slow flow valve 119 and ready light 120 in response to the status of pulse generator 12 and reset mechanism 118 of the value register. T8e dispenser 2 is also connected by piping to a liquid storage reservoir, not shown, whereby pump 128 is the means for supplying the flow of liquid. Its output is measured by a meter 122 which is connected through a mechanical computer 14 to the value register 3 which displays a continuous reading of the quantity of fuel dispensed in each operation. In addition to quantity or gallons reading the value register displays a money price reading. The value register is interlocked so that it must be reset to zero at the beginning of each dispensing operation. The reset mechanism 118 actuates the pump-motor power switch 11B, reset motor 11C and clear switch 11A. Accordingly, the dispenser 2 is inoperable until reset has taken place and is conditioned for dispensing when the reset cycle has been completed, as credit is established. Dispensing may then occur, upon actuation of the dispenser nozzle 1 by the operator.

Credit is established by means of the currency validator 4 which is a standard acceptor-validator mechanism available on the open market, and capable of accepting valid $1 bills and qaurters, and rejects the invalid ones. Upon the insertion of a valid $1 bill switch 76 will close and then reopens. This providing the initiation of credit. A similar process occurs with the insertion of a valid quarter. Switch 62 closes and reopens in response thereto.

Each dispenser has a dispensing hose that is terminated by a manually-controlled nozzle 1. The nozzle 1, of conventional construction, is stored on side of dispenser 2 and is associated with the actuation of reset 118 which must be turned to ON position to activate the dispenser 2 and must be turned to OFF position before the nozzle 1 can be stored.

The specific operation of the electronic control device will now be explained by referring to FIG. 2 in which switch 11A termed the "clear" switch is actuated by the reset mechanism 118 of the value register 3. This switch supplies the ground used to pulse the clear and preload circuit and also ties the reed switch 12 in the pump subtract pulsing unit to ground. It is important to note that this ground supply wire comes directly from the control and not from any common neutral wire in the pump. This is quite important as it reduces transients inductively induced in the pump wiring that carries the control signals.

Resistor 13 and capacitor 14 comprise an integrating circuit used to filter the input into the dual interface 361. This integrating circuit is also used to eliminate any contact bounce interference. The resistor 15 clamps or holds open circuit signal to the voltage level instead of some intermediate value.

Resistors 16 and 17 along with capacitor 18 make up a filtering and clamp circuit similar to that explained in the previous paragraph.

The dual interface 361 is a high noise immunity device. This device is used to buffer or interface between the pump wiring and the control wiring to reduce the chances of noise or transient signals being introduced into the control circuits.

Upon opening "clear" switch 11A the voltage rises to a value of $V_1$ at pin A of the dual interface 361 and at the same time the voltage rises to a value of $V_1$ at pin B of the same device. This signal is then fed into an integrating filter and clamping circuit as described in above paragraph. This signal is amplified by the two inverters 22 and 23 and then fed into the differentiating circuit 24/25. The output of this differentiating circuit is then fed into the 2-input nor gate 26. If either input of this nor gate goes to a logical "1" (high) input, the output of the gate will go to a logical "0" (low) which clears all the TTL devices 34, 35, 56, 57 & 70.

The other input into this nor gate 26 is caused to go to a logical "1" value if there is a positive going pulse injected into the differentiating circuit 27/28. This can be caused by a short transient signal in the $V_2$ supply or when the control is first turned on.

Burglar protection can be achieved through any ground seeking device which will make the clear circuit go to a logical "0", i.e., the output of the nor gate 26 to be grounded.

When "clear" switch 11A is closed the reed switch 12 is connected to ground. The reed switch is located inside the pump and is actuated magnetically. It is pulsed once for each penny's worth of gasoline pumped. The opening and closing of this reed subtract switch causes the input into the integrating filter and clamping circuit 16/17/18 to vary between $V_1$ and ground as described in the filtering and clamp circuit explained above. This signal is fed into one-half of the 361 dual interface. The output pin C of this interface 361 is again fed into an integrating filter and clamping circuit 29/30/31. The output of this circuit is fed into the input of the inverting Schmitt trigger 32 (NOTE: All other inputs of this Schmitt trigger are tied to $V_2$.) The Schmitt trigger's output is reinverted by the inverter 33. This signal is then used to clock the 5-bit shift register 34.

This 5-bit register 34 is programmed as a 5 divider. This is accomplished by presetting the first bit to a logical "1" (input A) and feeding the fifth bit (output E) into the serial input terminal.

Whenever the control receives a clear signal the 5-bit shift registers are cleared first and then preset to their appropriate patterns, e.g., shift register 34 is set to a logical 10,000. This is accomplished by inverting the clear with inverter 36 and applying this signal to the preset terminals of the 5-bit shift registers 34 and 35. At the same time, the clear signal is injected into the clear terminals through resistors 37 and 38. These resistors along with the inverter 36 are used to time the signals into the preset and clear terminals of the 5-bit shift registers 34 and 35.

The preset terminal signal is on after the clear terminal signal passes through the transistion region of the device due to the time lag of the inverter and the small time lag due to the resistor.

The resistor time lag is caused by the difference in slopes of the clear signal and the clear terminal signal. This finite slope difference is caused by the resistor and input impedance of the device forming a voltage divide, which keeps the clear terminal signal voltage at a higher level than the clear signal at all points as long as the signal is either rising or falling.

The signal from the A output terminal of the 5-bit shift register 34 is fed into the clock input of the 5-bit shift register 35. This shift register 35 is also set up as ÷5 divider making the combinations of shift registers 34 and 35 a 25 divider.

The preset bit pattern of 5-bit shift register 35 is a logical 10001. This preset pattern is used to time the slowdown valve and pump motor at the time of shutoff.

Each time the A output of the 5-bit shift register 35 goes to a logical "1" the differentiating circuit 39/40 along with the Schmitt trigger 41 produces a negative pulse.

In FIG. 3, this negative pulse is then fed into the countdown input of a 2-bit binary up-down counter. The logical component parts of this up-down counter are: inverters 50/51, 2-input nands 52/53/54/55, flip-flops 56/57, 3-input nands 58/59, and the 2-input nors 60/61. This is a standard up-down counter and needs no further explanation.

A countup input into this 2-bit binary up-down inverter is supplied by the quarter switch 62. When 62 is closed and opened it feeds a negative pulse into inverter 63. The input of this inverter is tied to $V_2$ through the resistor 64. This resistor clamps the input of the inverter to a $V_2$ valve instead of some intermediate voltage valve when the switch is open. The output of inverter 63 is fed into the integrating filter 65/66. This circuit eliminates contact bounce effects and filters out high frequency interference. The output of this filter is then fed into the Schmitt trigger 67 which in turn is used to pulse the 2-bit binary up-down counter. In other words, a quarter's worth of credit is established when the quarter switch 63 is actuated by a quarter in the currency validator.

Figure 4:
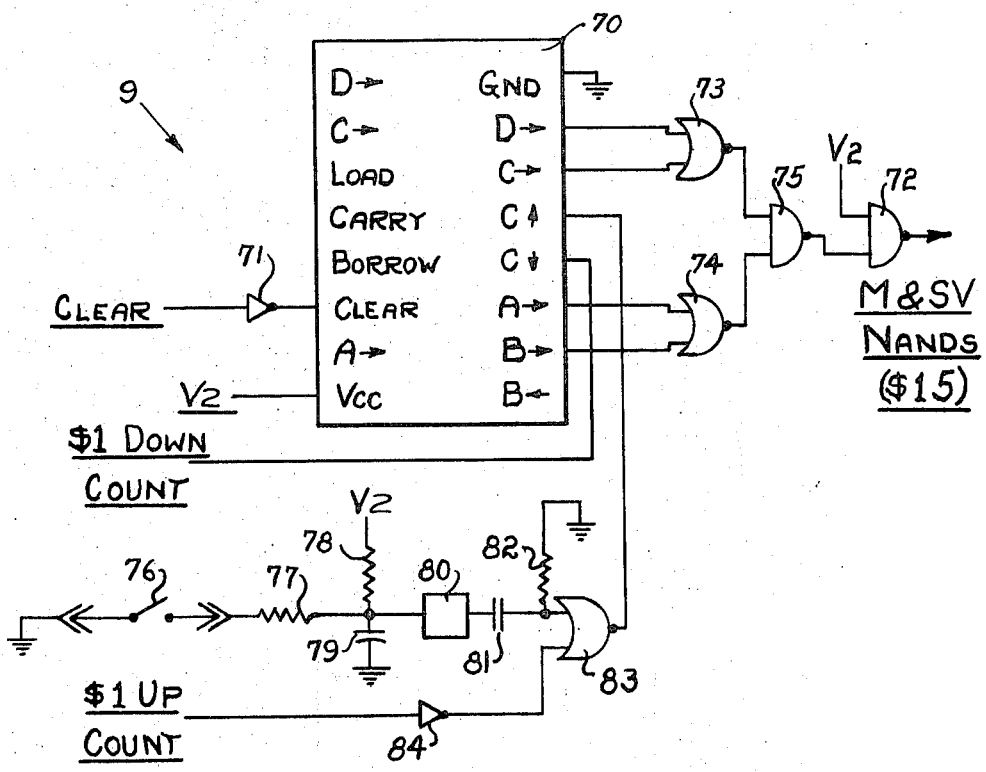
FIG. 4 is an electrical schematic showing the accumulation of credit by means of $1 bill insertion and the correlation between $1 bill credit signal and the $1 bill delivery signal.

In FIG. 4, the input and output of the second credit accumulating unit. The main component being the 4-bit binary up-down counter 70.

The clear signal has to be inverted by inverter 71 to set the counter to its clear state of logical 0000.

If any output of this counter is a logical "1" the output of the 2-input nand gate 72 is used as an inverter.

A dollar's worth of credit may be established with switch 76 which is inside currency validator. Upon closing 76 the output of the integrating and clamping circuit 77/78/79, goes to zero. This causes the Schmitt trigger output to go to a logical "1." This signal is then fed into the differentiating circuits 81/82, which insures a short negative pulse. This negative pulse is then fed to the 2-input nor gate 83. When either input of this nor gate goes to a logical "1" the output will pulse the countup terminal of the 4-bit up-down binary counter 70 adding a dollar's worth of credit to the accumulator.

The other input into this gate 83 is pulsed from the 2-bit binary up-down counter, shown on FIG. 3, through the inverter 84, i.e., if the 2-bit binary counter accumulates four quarters it establishes an additional dollar's worth of credit to the dollar accumulator.

Referring to FIG. 5, the logic circuits that actuate the power control elements of the motor control and slow flow valve are shown.

The motor control nand gate 100 is a 4-input nand 100. Only three inputs are used on this gate, the fourth being tied to $V_2$. The output of the nand gate will be a logical "1" as long as any input is a logical "0", i.e., if the shift register 35 or 2-bit binary up-down counter is not at its cleared state. This positive $V_2$ output is used to bias transistor 104 into conduction through the manual control switch 106 and the base bias resistor 107. The transistor 104 in turn switches the motor power triac 102 into conduction. This turns the "ready" light on and enables the motor to run, i.e., the pump motor 117 will run when both the triac 102 is in the conducting state and the motor reset controlled motor power switch 113 is closed. Current through the triac 102's gate is limited by resistor 109.

The slowdown control nand gate is the 4-input nand gate 101. Only three inputs are used, one being tied to $V_2$. The output of this nand gate will be a logical "1" as long as any input is a logical "0", i.e. if 2-bit binary up-down counter shown in FIG. 3 is not at its cleared state or if the 5-bit shift register 35 shown on FIG. 2 in the ÷25 divider has a logical "0" in the D output terminal. This slowdown nand gate output signal is fed into the 2-input nand gate 111 along with the output of the motor nand gate 100. If either input of this gate is a logical "0" the output will be a logical "1." This output signal is then inverted by the 2-input nand gate 112, one input being tied to $V_2$. It follows that the output of the 2-input nand gate 112 will be a logical "0" if either the motor nand 100 or the slow flow valve nand 101 outputs are at a logical "0", i.e. if the 2-bit binary up-down counter on FIG. 3 are their cleared states and the 5-bit shifts register 35 on FIG. 2 in the 25 divider has a positive output at either the D or A output terminals. The output of the 2-input nand gate 112 is used to bias transistor 105 through the manual control switch 106B which in turn controls the triac 103, i.e., the triac 103 will be in the conducting state if the transistor 105 is biased on through resistor 108. Current through the gate of triac 103 is limited by the resistor 110.

The circuits 113/114 and 115/116 are used to limit the dv/dt across the terminals T1-T2 of triacs 102 and 103. These circuits were added to eliminate any possibility of a triac continuing to conduct. After being gated to shutoff as there is inductance in the loads the triacs control. These circuits may not be necessary, but were added as extra protection against a runaway condition in the automatic control.

Both triacs 102 and 103 are enabled to conduct if the manual control switch 106 is switched to the normally closed "manual" position. This allows the transistors 104 and 105 to be biased on by connecting their bases to $V_2$ through the base bias resistors 107 and 108.

While specific structures embodying the invention have been set forth herein for purposes of illustration, the protection granted by any patent issued on this, but should extend to any structures which fall fairly within the scope of the claims which are appended hereto.

I claim:

1. A liquid dispensing apparatus comprising a manually operable nozzle valve, a pump for supplying a flow of liquid to said nozzle valve, a pump motor including pump supply measuring means for determining the amount of liquid dispensed, a resettable value register, including a clear switch actuated thereby, computing means connected to be driven by said measuring means and connected to drive said resettable value register in accordance with the value of the liquid dispensed, pulse generation means for transmitting electrical pulses commensurate with fluid delivered to said nozzle valve, wherein the improvement comprises a control means for control of said pump motor, said control means comprising:

a. registering means comprising two cascaded, 5-bit shift registers with parallel inputs and outputs connected as a ring counter for accumulating input pulses from said pulse generation means at a substantially unlimited rate, and for producing an output pulse for each predetermined number of said input pulses, and b. means for transmitting said output pulse to said pump motor.

2. A liquid dispensing apparatus as defined in claim 1 wherein said control means further comprising:

a. a currency validator capable of accepting valid currency and rejecting invalid currency;

b. credit establishing means in response to valid currency accepted by said currency validator wherein said credit establishing means further comprises:
1. a first credit accumulating means responsive to the establishment of coin currency credit in said credit establishing means; and
2. a second credit accumulating means responsive to the establishment of paper currency credit in said credit establishing means;

c. a logic comparator means effective to operate bi-directionally as a binary in response to said registering means output pulse and said credit establishing means as to produce an output control signal for each condition therein; and d. motor control means for transmitting said output control signal from said logic comparator to said pump motor.

3. A liquid dispensing apparatus defined in claim 1 wherein said control means further comprises:

a. a nand gate means to enable said pump motor to operate in response to said output control signals and to deactivate said pump motor coincidental with termination of said output control signals; and b. a manual switch means to disable said control means and allow independent operation.

4. A liquid dispensing apparatus defined in claim 2 wherein said first credit accumulating means includes a 2-bit binary up-down counter.

5. A liquid dispensing apparatus defined in claim 2 wherein said second credit accumulating means includes a synchronous 4-bit up-down binary accumulator.

6. A liquid dispensing apparatus as defined in claim 2 wherein said logic comparator means is further effective to receive said first credit accumulating means and said second credit accumulating means coterminous with the receipt of said control means thereby allowing currency deposition while dispensing liquid.

* * * * *